(12) United States Patent
Settelmayer

(10) Patent No.: US 9,931,994 B2
(45) Date of Patent: Apr. 3, 2018

(54) DEPLOYABLE INTERFERENCE MECHANISM FOR VARIABLY POSITIONABLE BICYCLE WHEEL ANCHOR

(71) Applicant: Thule Sweden AB, Hillerstorp (SE)

(72) Inventor: Joseph Settelmayer, McKinleyville, CA (US)

(73) Assignee: Thule Sweden AB, Hillerstorp (SE)

( * ) Notice: Subject to any disclaimer, the term of this patent is extended or adjusted under 35 U.S.C. 154(b) by 77 days.

(21) Appl. No.: 14/815,516

(22) Filed: Jul. 31, 2015

(65) Prior Publication Data

US 2016/0039354 A1    Feb. 11, 2016

Related U.S. Application Data

(60) Provisional application No. 62/033,320, filed on Aug. 5, 2014.

(51) Int. Cl.
*B60R 9/10* (2006.01)

(52) U.S. Cl.
CPC .................................... *B60R 9/10* (2013.01)

(58) Field of Classification Search
CPC ............. Y10T 403/589; Y10T 70/5872; Y10T 24/44248; Y10T 24/44239; B60R 9/048; B60R 9/058; B60R 9/045; B60R 9/10; F16B 7/0473; F16B 2/185; Y10S 224/924

USPC ......................................................... 224/324
See application file for complete search history.

(56) References Cited

U.S. PATENT DOCUMENTS

| 5,052,605 | A | * | 10/1991 | Johansson | ................. | B60R 9/10 |
| | | | | | | 224/324 |
| 6,681,971 | B2 | * | 1/2004 | Laverack | ................ | B60R 9/045 |
| | | | | | | 224/319 |

* cited by examiner

*Primary Examiner* — Nathan J Newhouse
*Assistant Examiner* — Matthew Theis
(74) *Attorney, Agent, or Firm* — Sterne, Kessler, Goldstein & Fox P.L.L.C.

(57) ABSTRACT

A variably positionable bicycle wheel anchor for fixing a bicycle wheel at a desired location along an elongate support rail. The bicycle wheel anchor includes a body configured to be slidingly coupled to an elongate support rail for variable, fixed positioning of the body along a length of the elongate support rail. The underside of the body has a support rail engagement surface and the upper side of the body has a bicycle wheel receiver. The wheel anchor has a deployable interference mechanism coupled to the body and having a deployed configuration in which at least a portion of the interference mechanism protrudes beyond the underside of the body for releasable engagement with the elongate support rail.

20 Claims, 5 Drawing Sheets

DEPLOYABLE INTERFERENCE MECHANISM FOR VARIABLY POSITIONABLE BICYCLE WHEEL ANCHOR

FIELD

The present disclosure relates generally to load carriers for a vehicle, and in particular, to load carriers mountable to the roof of a vehicle for carrying a bicycle.

BACKGROUND

Load carriers have been used to transport various sports equipment to desired destinations. For example bicycle enthusiasts often travel to destinations via automobile vehicles to participate in riding activities, and thus need a secure way of transporting the bicycle. Bicycle load carriers can be attached to the rear or roof of the vehicles and have various securement mechanism for fixing the bicycles or other sports equipment thereon.

BRIEF DESCRIPTION OF THE DRAWINGS

Implementations of the present technology will now be described, by way of example only, with reference to the attached figures, wherein.

DETAILED DESCRIPTION

Figure 1:
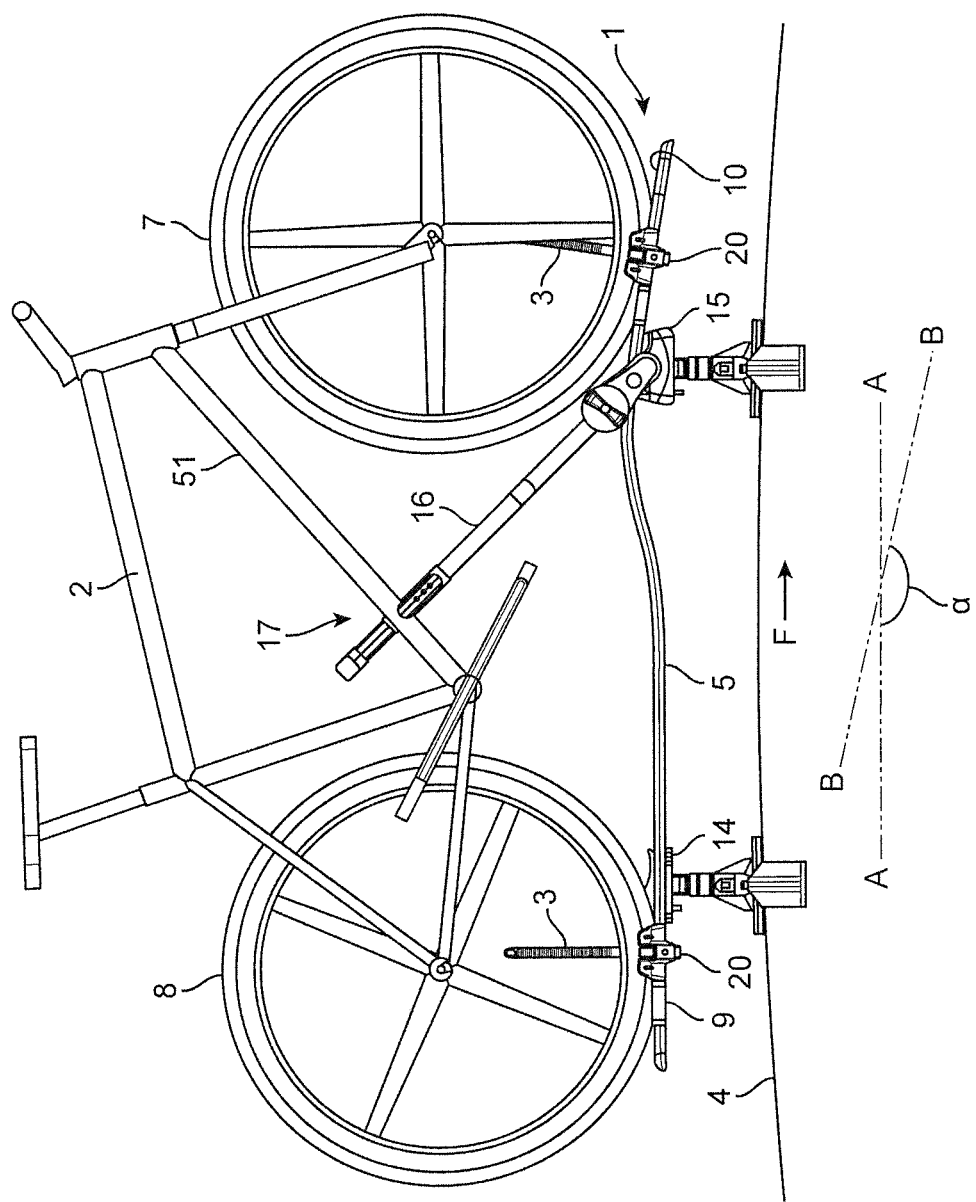
FIG. 1 is a schematic diagram of one example of a bicycle load carrier with a bicycle wheel anchor having a deployable interference mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other thing that "substantially" modifies, such that the component need not be exact. For example, substantially cylindrical means that the object resembles a cylinder, but can have one or more deviations from a true cylinder. The terms "comprising," "including" and "having" are used interchangeably in this disclosure. The terms "comprising," "including" and "having" mean to include, but not necessarily be limited to the things so described.

Disclosed herein is a bicycle wheel anchor that induces resistance to sliding along the support rail of a bicycle load carrier when a bicycle is installed thereon, but has reduced resistance when a bicycle is not installed. This therefore permits variable adjustment of the bicycle wheel anchor by a user prior to installing the bicycle, in order to accommodate the mounting of various sized bicycles and provide more stable securement once the bicycle is installed.

Accordingly, a variably positionable wheel anchor is disclosed herein having a deployable interference mechanism for resisting sliding or translation along the length of a support frame of a load carrier. The wheel anchor is made up of a body configured to be slidingly coupled to an elongate support rail. The wheel anchor has an underside having a support rail engagement surface and an upper side having a bicycle wheel receiver. The interference mechanism is coupled to the body and has a deployed configuration in which at least a portion of the interference mechanism protrudes beyond the underside of the body for releasable engagement with the elongate support rail.

The deployable interference mechanism includes an actuable friction inducer extending between the underside and upper side of the body of the wheel anchor. The actuable friction inducer has an actuator portion exposed at the upper side of the body and a rail engaging portion exposed at the underside of the body.

When a wheel anchor is mounted onto the support rail of bicycle carrier, a bicycle can be installed on the bicycle carrier such that one of its wheels is received in the wheel anchor. The load caused by the weight of the wheel (and bicycle) causes the interference mechanism to deploy to its deployed configuration thus protruding beyond the underside and engage the support rail of the bicycle carrier. At the same time, the actuable friction inducer is urged against a portion of the rail thereby inducing friction and resisting sliding of the wheel anchor along the rail. When the wheel is removed from the wheel anchor, the interference mechanism is retracted back from its deployed position. The wheel anchor can be employed to receive the back wheel, the front wheel or both wheels.

An illustrated embodiment of a load carrier 1 according to the present disclosure is shown for example in FIG. 1. As shown, the load carrier 1 is loaded with a bicycle 2 with a front wheel 7 and a rear wheel 8. The carrier is fixed to the roof 4 of vehicle via cross-bars 13. An elongate support rail 5 forms a mechanical support frame for maintaining the weight of the bicycle installed therein. In the illustrated example, the support rail 5 is provided with a front section 10 for supporting the front wheel 7 and a rear section 9 for supporting the rear wheel 8. The front section 10 can be inclined with respect to horizontal while the rear section 9 can be substantially horizontally oriented. The longitudinal direction (axis) of rear section 9 on which the rear wheel of the bicycle 2 is placed (indicated by the dash-dotted line A-A) and the longitudinal direction (axis) front section 10 of the support rail 5 in the area on which the front wheel of the bicycle is placed (indicated by the dashed line B-B) can intersect one another at an angle alpha α. The incline of the front section 10 can cause the bicycle 2 to be urged in a forward direction along arrow F. Although the front section 10 is inclined in the example shown in FIG. 1, in other examples, the front and back portions can be aligned in the same plane such that the support rail is essentially straight along its length.

The wheels 7, 8 are received in variably positionable bicycle wheel anchors 20, which are mounted on the support rail on front section 10 and rear section 9. Retaining straps 3, while shown upstanding position in FIG. 1, can be flexibly wrapped over the wheels 7, 8 to secure them in place.

A retaining arm 16 with a claw grip 17 can be coupled to the support rail 5 at front connecting device 15. The retaining arm can extend to clamp a portion of the bicycle frame 51 to secure the bicycle on the load carrier 1. The retaining arm 16 is pivotable attached to connecting device 15 such that it can be pivoted from a horizontal position approximately in line with the rear section 9 to the securing position shown in FIG. 1.

Figure 2:
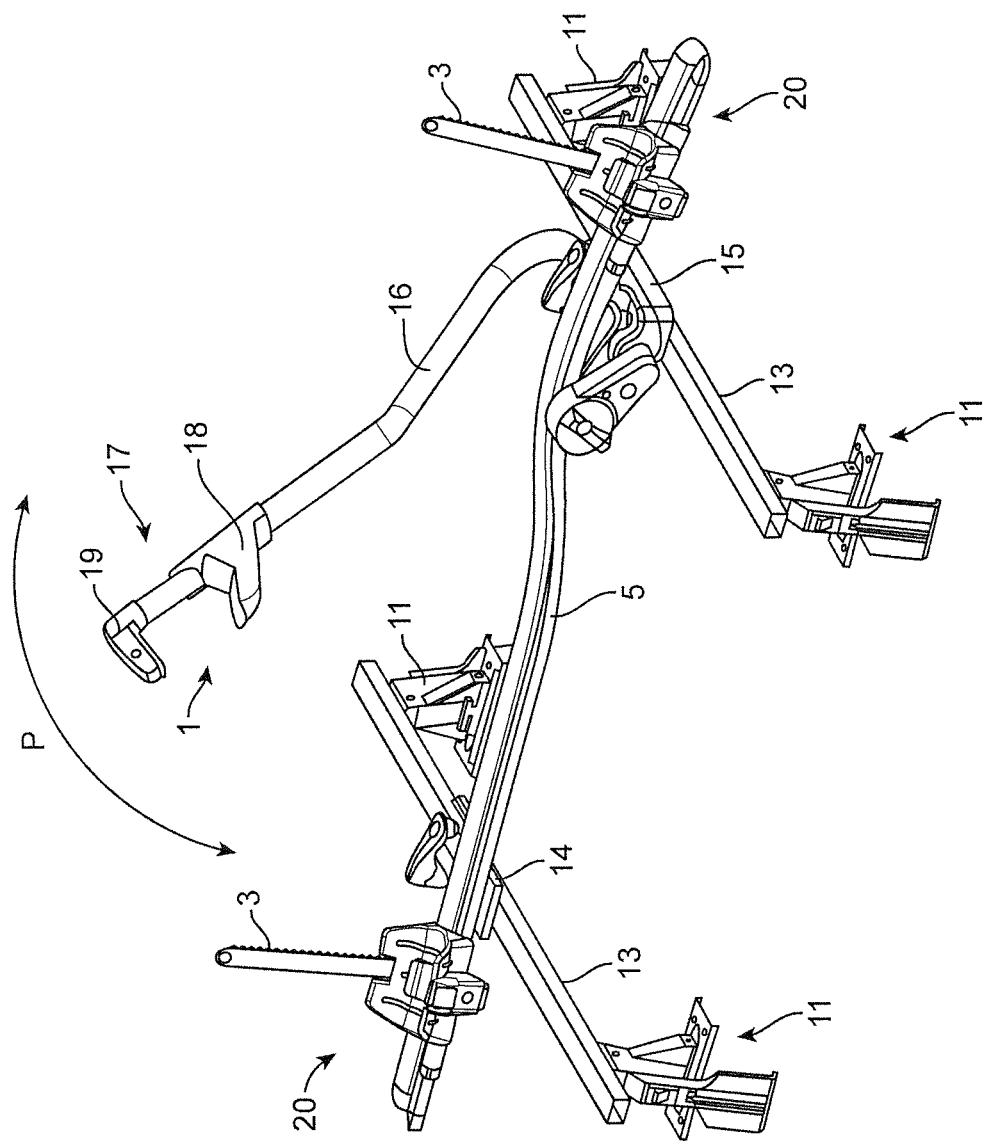
FIG. 2 is a schematic diagram of one example of a bicycle load carrier with a bicycle wheel anchor having a deployable interference mechanism.

An additional embodiment is illustrated in FIG. 2 wherein the load carrier 1 is shown mounted on cross bars 13. Feet 11 are shown at each end of the cross bars 13 which mount the cross bars to a vehicle roof. When mounted, the cross bars 13 generally extend across the roof from each of the lateral sides of the vehicle. As shown, at approximately a midpoint of the cross bars 13, the load carrier 1 can be mounted thereon transverse to the longitudinal direction cross bars 13. A rear connecting device 14 can mount the rear section 9 and the front connecting device 15 can mount the front section 10. The connecting devices 14, 15 can include a clamp which tightens around the cross bars 13 fixing the load carrier 1 to the cross-bars 13.

Additionally shown, the retaining arm 16 is, as described above, pivotably connected to the rail section 5 and can be pivoted in the direction indicated by the double arrow P. The retaining arm 16 is provided with a claw grip 17 consisting of a first jaw 18 and a second jaw 19.

Figure 3:
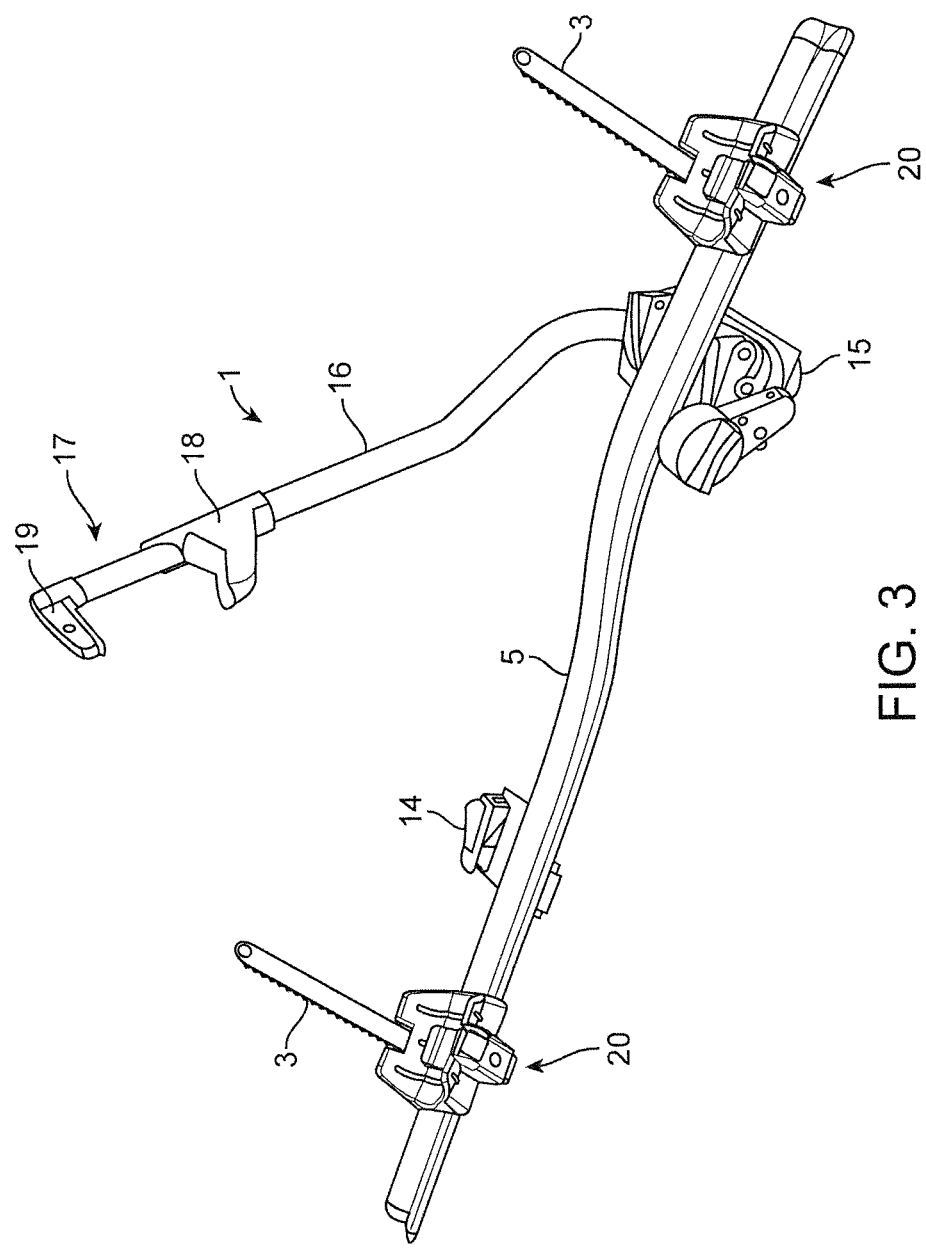
FIG. 3 is a schematic diagram of one example of a bicycle load carrier with a bicycle wheel anchor having a deployable interference mechanism.

The load carrier 1 is shown in FIG. 3, but not mounted to cross-bars of a vehicle. As shown, the variably positionable bicycle wheel anchors 20 are mounted on the front section 10 and rear section 9 of the support rail 5. The front bicycle wheel anchor 20 shows retaining strap 3 in an upstanding position, whereas, the retaining strap 3 of the rear bicycle wheel anchor 20 is shown flexibly extended over upper side of the body of the bicycle wheel anchor 20.

Figure 4:
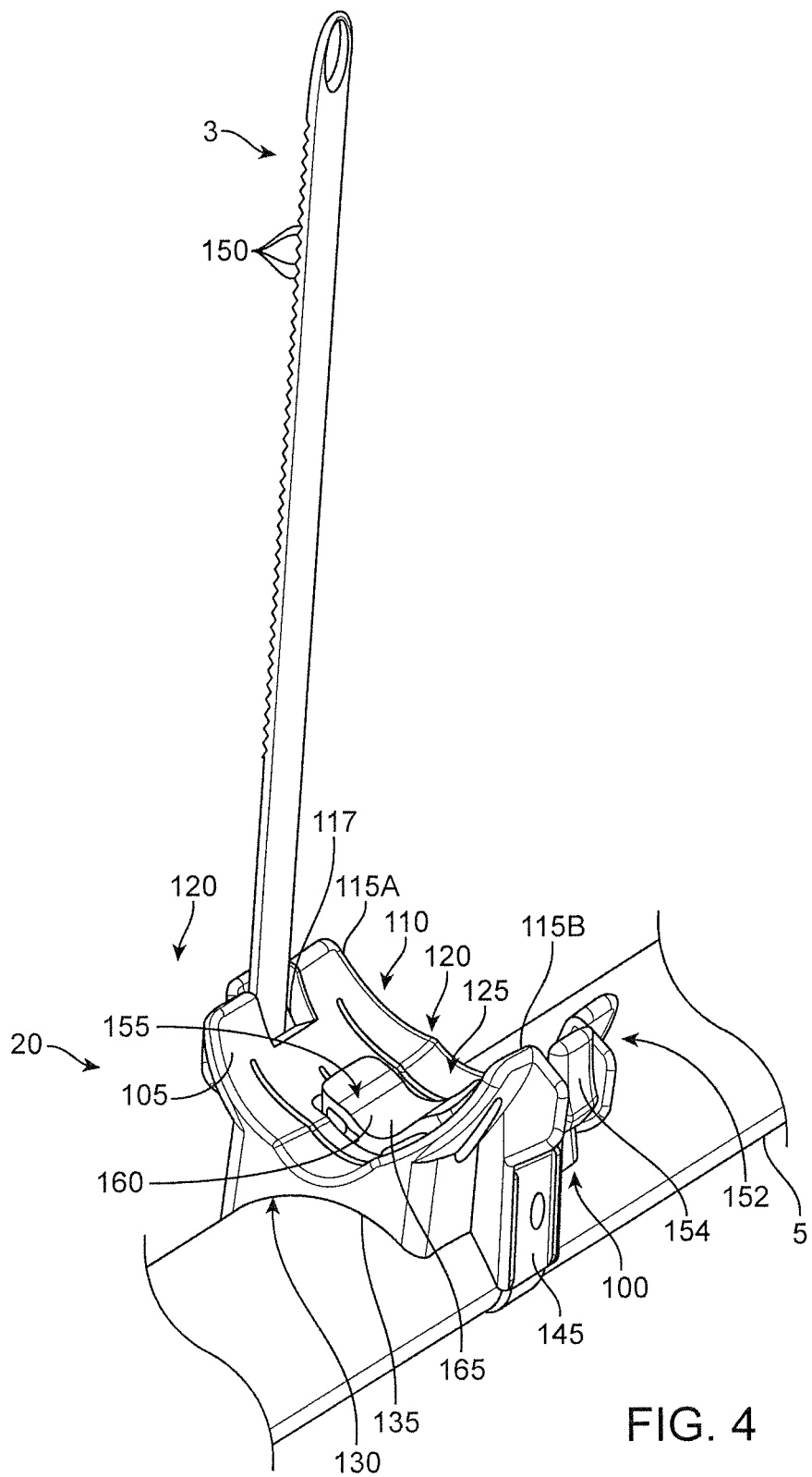
FIG. 4 is a schematic diagram of one example of a bicycle wheel anchor having a deployable interference mechanism.

A close-up view of bicycle wheel anchor 20 is shown in FIG. 4. The wheel anchor 20 has a body 100. The body 100 has an upper side 105 with a bicycle wheel receiver 110 shaped to receive a bicycle wheel. The bicycle wheel receiver 110 has inclined walls 115A and 115B extending from both lateral sides of the body 100 from a lower trough portion 120. The inclined walls 115A and 115B and lower trough portion 120 form a U shaped cradle structure for receiving a bicycle wheel. An additional concave indentation 125 can be formed in the lower portion 120 or trough, of the upper side 105.

Figure 5:
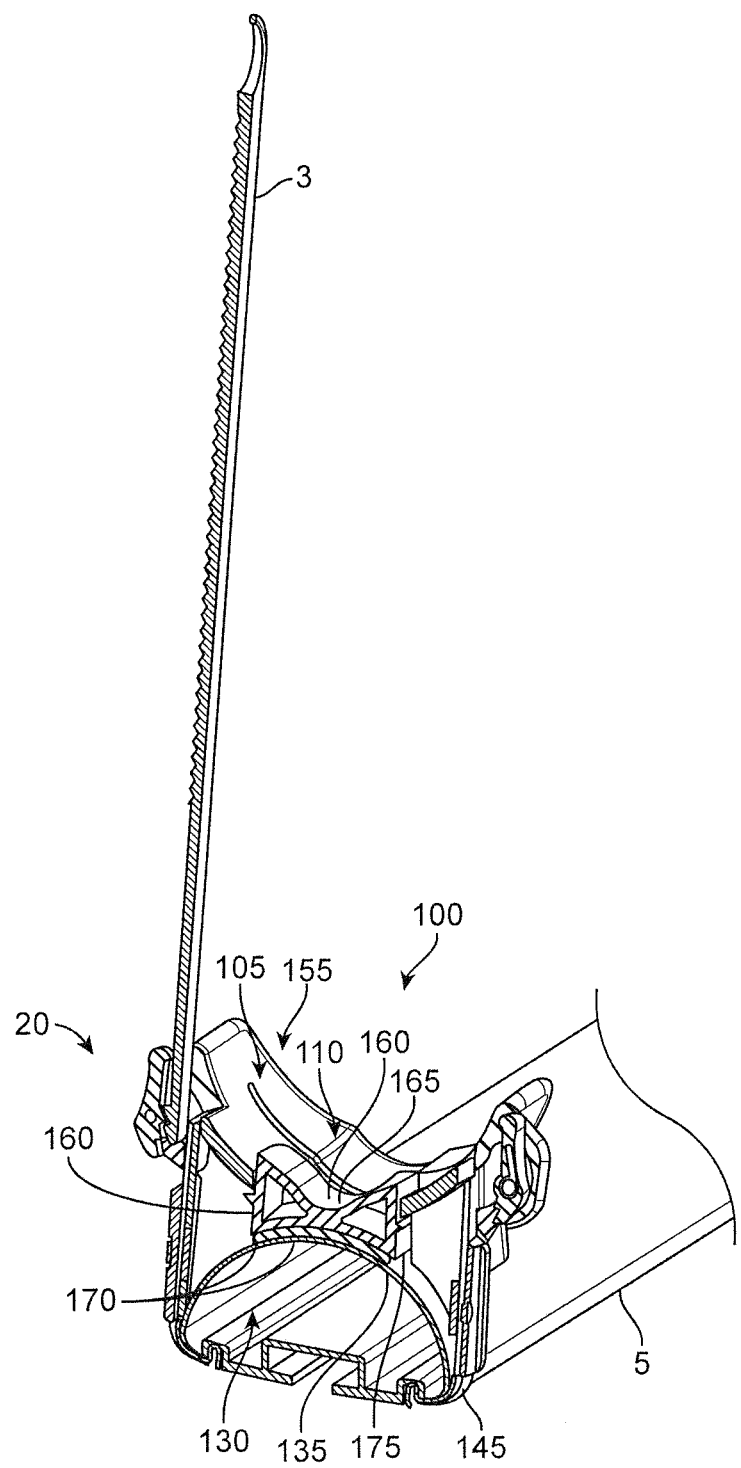
FIG. 5 is a schematic sectional diagram of one example of a bicycle wheel anchor having a deployable interference mechanism.

The body 100 has an underside 130 with a support rail engagement surface 135. Accordingly, the bicycle wheel anchor 20 can be mounted on the support rail 5 with the underside 130 engaging the support rail 5 at the support rail engagement surface 135. The underside 130 can have a shape conforming to the top surface of the support rail 5. Accordingly, if the support rail 5 has a general U-shape, cradle structure or an arc shaped upper surface as illustrated in FIG. 5, then the underside 130 is shaped to accommodate the same. In the examples of FIGS. 4 and 5, the support rail engagement surface 135 at the underside of the body 100 has a substantially concave cross sectional shape. In the examples of FIGS. 1-3, the support rail engagement surface 135 at the underside of the body 100 has a cross sectional shape that is at least partially V-shaped.

The body 100 can have fixing arms 145 extending beneath the body 100 to hook to the underside 130 of the rail 5.

Coupled to the body 100 and extending from one of the inclined walls 115A and 115B, is retaining strap 3. A notch 117 is formed in the side of one of the inclined walls 115A through which the retaining strap 3 extends. The retaining strap can be fixably coupled to the outside of the inclined wall 115A or have an internal pocket from which it extends. Retaining strap 3 is flexible and can have projections 150 along its length. A ratcheting mechanism 152 is shown on the outside of the opposite wall 115B. The ratcheting mechanism 152 can include a clamping lever 154 having an aperture through which the retaining strap 3 passes. When the tip of the retaining strap 3 is inserted into the ratcheting mechanism 152, the clamping lever 154 can be turned to lock at any of the projections 150 along the retaining strap 3 to lock it therein.

The lower trough portion 120 of the body 100 can have a deployable interference mechanism 155 integrated and coupled thereto. A sectional view of the deployable interference mechanism 155 of example 4 is illustrated in FIG. 5. As illustrated in FIG. 5, the deployable interference mechanism 155 has an actuable friction inducer 160 extending between the underside 130 and upper side 105 of the body. As shown in FIG. 5, the actuable friction inducer 160 has an actuator portion 165 exposed at the upper side 105 of the body 100 and which protrudes beyond the surface of the upper side 105 of the body 100. Although shown as protruding beyond the surface of the uppers side 105, in other examples, it can remain flush with the surface or beneath the surface. However, in any case, it is positioned such that when a bicycle wheel is placed in the anchor 20 it contacts and presses against the actuator portion 165.

Further, the actuable friction inducer 160 has a rail engaging portion 170 exposed at the underside of the body. The rail engaging portion 170 can be urged against the support rail 5 thereby inducing frictional resistance to movement or sliding of the wheel anchor 20 on support rail 5. These properties discussed in more detail as follows.

The interference mechanism 155 can actuate between a deployed configuration and a retracted configuration. To actuate to a deployed configuration, a bicycle wheel can be placed in the wheel anchor 20, such that the wheel is received in the bicycle wheel receiver 110 of the upper side 105 of the body 100. For example, the bicycle 2 as shown in FIG. 1 can have its rear and/or front tires received in the wheel anchor 20. In such case, the weight of the wheel, as well as the bike, will be placed on the exposed actuator portion 165. In this manner a load is applied on the exposed actuator portion 165 and the interference mechanism 155 is actuated to a deployed configuration. In other words, the actuator portion 165 of actuable friction inducer 160 is pressed down by the load imposed by the bicycle wheel thus actuating the interference mechanism 155 into the deployed configuration.

As previously noted, and shown in FIG. 5, the actuable friction inducer 160 extends between the underside 130 and upper side 105 of the body 100. Accordingly, when a load is placed on the actuator portion 165, the actuable friction inducer 160 is urged downward, thus causing the rail engaging portion 170 to be pressed and urged into engagement with the rail 5. Accordingly, rail engaging portion 170 (which is a portion of the interference mechanism 155) will then protrude beyond the underside 130 of the body 100 into engagement with the support rail 5. By engaging the support rail 5 in this manner friction is induced by actuable friction inducer 160 thereby causing resistance to sliding by the body 100 on the support rail 5.

During deployment, actuable friction inducer 160 can slide within an aperture 175 to protrude rail engaging portion 170. Alternatively, and as illustrated in FIG. 5, the entire piece (actuable friction inducer 160) can deform under load, and thus "bend" to some degree, thus urging the rail engaging portion 170 to protrude beyond the underside 130. Due to the movement of the actuable friction inducer 160, the weight of the bicycle wheel and bicycle can be transferred through to the urge the rail engaging portion 170 against the support rail 5, thereby inducing friction. Thus, the greater the load, the greater the friction induced; the lighter the load, the less friction induced.

The entire actuable friction inducer 160 can be made up of a material that deforms, for example an elastomeric material such as natural or synthetic rubber or a plastic when can deform under load. In further examples, the actuable friction inducer 160 is made up predominantly of a hard plastic with the lower portion, such as rail engaging portion 170, made up of an elastomeric material such as natural or synthetic rubber. The rail engaging portion 170 can have a higher coefficient of friction than the remaining underside 130 of the body 100.

If the wheel anchor 20 is removed and separated from the support rail 5, the interference mechanism 155 can be urged to protrude beyond the underside 130 of the body 100 via loading the actuator portion 165 as just discussed. The protrusion of a portion of the interference mechanism 155, such as the rail engaging portion 170, may be more perceptible when separated from the support rail 5. When placed on the support rail 5, in some examples the support rail 5 may be some distance from the rail engaging portion 170, in which case, when actuated to the deployed configuration the rail engaging portion 170 will protrude a distance beyond the underside of the body 100 to engage the support rail 5. In some examples, the support rail 5 will be flush against the support rail engagement surface 135. Accordingly, in this case the protrusion of the rail engaging portion 170 may be minimal; however, it will be understood that in order to engage the rail 5, rail engaging portion 170 protrudes beyond the underside 130 of the body 100, however small.

When a bicycle wheel is removed from the wheel anchor 20, there is then no load imposed on the actuator portion 165. The actuable friction inducer 160 then returns to its original unloaded position. In such case the portion of the interference mechanism 155 which had been protruding beyond the underside 130 of the body 100 (namely, the rail engaging portion 170), is retracted to a non-protruding position, or protrudes to a lesser extent than when in the deployed configuration, or is urged to a lesser degree against the rail 5. For example, the rail engaging portion 170 is retracted toward within the body relative the deployed configuration. In such retracted configuration, a user is able to adjust the wheel anchor 20 back and forth on the support rail 5, thus permitting variable positioning of the body 100 along the length of the support rail 5.

The difference in degree of protrusion of the rail engaging portion 170 between the deployed and retracted positions may be more apparent when the wheel anchor 20 is removed and separated from the support rail 5. In particular, in the retracted configuration, the rail engaging portion 170 may still protrude beyond the underside 130 of the body 100, but to a lesser extent than in the deployed configuration. In other examples, the rail engaging portion 170 is retracted to be flush with the underside 130 of the body 100, or within the underside 130 of the body 100.

In the case where the rail engaging portion 170 still protrudes beyond the underside 130 of the body 100, the rail engaging portion 170 may engage the support rail 5 even in the retracted configuration. However, it will be urged to a lesser degree against the support rail 5 than in the deployed configuration. In particular, in the deployed configuration, the rail engaging portion 170 would be urged against the support rail 5 to a greater degree, thus inducing greater friction by the actuable friction inducer 160. As a result, there would be increased resistance to sliding of the wheel anchor 20 along the support rail 5 in the deployed configuration than in the retracted configuration.

Accordingly, in the retracted configuration, the wheel anchor 20 can be variably moved up and down the support rail 5, while in the deployed configuration with a bicycle installed, the wheel anchor 20 will be fixed in place.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A variably positionable bicycle wheel anchor for fixing a bicycle wheel at a desired location along an elongate support rail, the bicycle wheel anchor comprising:
   a body configured to be slidingly coupled to an elongate support rail for variable, fixed positioning of the body along a length of the elongate support rail;
   an underside of the body comprising a support rail engagement surface;
   an upper side of the body comprising a bicycle wheel receiver; and
   a deployable interference mechanism coupled to the body and having a deployed configuration in which at least a portion of the interference mechanism protrudes beyond the underside of the body for releasable engagement with the elongate support rail,
   wherein the deployable interference mechanism is configured to be actuated to the deployed configuration by a load imposed by a bicycle wheel in the bicycle wheel receiver.

2. The bicycle wheel anchor of claim 1, wherein the deployable interference mechanism has a retracted configuration wherein the portion of the interference mechanism protruding beyond the underside of the body is retracted toward the body relative the deployed configuration.

3. The bicycle wheel anchor of claim 1, wherein the deployable interference mechanism comprises an actuable friction inducer extending between the underside and upper side of the body, the actuable friction inducer having an actuator portion exposed at the upper side of the body and a rail engaging portion exposed at the underside of the body.

4. The bicycle wheel anchor of claim 3, wherein at least a portion of the rail engaging portion of the actuable friction inducer protrudes beyond the underside of the body when the interference mechanism is in the deployed configuration.

5. The bicycle wheel anchor of claim 3, wherein the rail engaging portion of the actuable friction inducer has a higher coefficient of friction than a remainder of the support rail engagement surface.

6. The bicycle wheel anchor of claim 1, further comprising a retaining strap coupled to the body and extendable over the upper side of the body to secure a bicycle wheel within the bicycle wheel receiver.

7. The bicycle wheel anchor of claim 3, wherein the actuable friction inducer is comprised of an elastomeric material deformable under a load to protrude beyond the underside of the body.

8. The bicycle wheel anchor of claim 1, wherein a top surface of the upper side forms a U shaped cradle for receiving a bicycle wheel.

9. A load carrier mountable on the roof of a vehicle, comprising:
   an elongate support rail;
   a variably positionable bicycle wheel anchor comprising a body configured to be slidingly coupled to an elongate support rail for variable, fixed positioning of the body along a length of the elongate support rail, the body defining an aperture;
   an underside of the body comprising a support rail engagement surface;
   an upper side of the body comprising a bicycle wheel receiver; and
   a deployable interference mechanism coupled to the body and disposed in the aperture, the deployable interference mechanism having a deployed configuration in which at least a portion of the interference mechanism protrudes beyond the underside of the body and directly engages the elongate support rail,
   wherein the deployable interference mechanism is configured to be actuated to the deployed configuration by a load imposed by a bicycle wheel in the bicycle wheel receiver.

10. The load carrier of claim 9, further comprising a connecting device for coupling the load carrier to cross-bars of a vehicle.

11. The load carrier of claim 9, wherein the deployable interference mechanism has a retracted configuration wherein the portion of the interference mechanism protruding beyond the underside of the body is retracted from the deployed configuration.

12. The load carrier of claim 9, wherein the deployable interference mechanism comprises an actuable friction inducer extending between the underside and upper side of the body, the actuable friction inducer having an actuator portion exposed at the upper side of the body and a rail engaging portion exposed at the underside of the body.

13. The load carrier of claim 12, wherein at least a portion of the rail engaging portion of the actuable friction inducer protrudes beyond the underside of the body when the interference mechanism is in the deployed configuration.

14. The load carrier of claim 12, wherein the rail engaging portion has a higher coefficient of friction than a remainder of the support rail engagement surface.

15. The load carrier of claim 9, further comprising a retaining strap coupled to the body and extendable over the upper side of the body to secure a bicycle wheel within the bicycle wheel receiver.

16. The load carrier of claim 12, wherein the actuable friction inducer is comprised of an elastomeric material deformable under a load to protrude beyond the underside of the body.

17. The load carrier of claim 9, wherein a top surface of the upper side forms a U-shaped cradle for receiving a bicycle wheel.

18. The load carrier of claim 9, wherein the support rail engagement surface at the underside of the body has a substantially concave cross sectional shape.

19. The load carrier of claim 18, wherein the substantially concave surface at the underside of the body is configured to matingly engage a convex upper surface of a D-shaped support rail.

20. The load carrier of claim 9, wherein the support rail engagement surface at the underside of the body has a cross sectional shape that is at least partially V-shaped.

* * * * *